Patented June 28, 1927.

1,633,711

UNITED STATES PATENT OFFICE.

ROBERT K. PRINCE, OF WESTFIELD, MASSACHUSETTS, ASSIGNOR TO VITAMIN FOOD CO., INC., OF NEW YORK, N. Y., A CORPORATION OF DELAWARE.

VITAMIN FOOD PRODUCT AND METHOD.

No Drawing. Application filed January 2, 1925. Serial No. 280.

It is known that many food substances valuable because of their vitamin-content, lose their potency, more or less rapidly in accordance with their individual characteristics. This is largely due to the destructive action of the oxygen of the air. It is the object of my invention to provide a vitamin food product which shall maintain its potency, and to provide a method of readily producing the same.

In my method I produce a vitamin food product separated into small units each enclosed within a soluble film, which film is resistant against penetration by oxygen.

I have discovered that a solution of Karaya gum in water is adapted to serve as the soluble film-forming material, although other soluble and edible gums and resins may be used for the purpose. As an example, dried yeast may be mixed with 10% by weight of A vitamin-potent cod liver oil. After the two substances are thoroughly mixed I take 4% by weight of a solution consisting of water in which is dissolved 2.8% of Karaya gum, and thoroughly incorporate this gum solution with the mixture of yeast and cod liver oil. The mass is then allowed to dry slowly. A careful examination of the product will show that a film or skin of gum is formed over the granules of oil-soaked yeast, which film is resistant to penetration by oxygen and affords an effectual protection against the destruction of the A vitamin.

The expression "granular form" in the appended claims is used in the generic sense of separate particles, whether such particles be entirely without adherence to one another or not. In the specific example given, the dried yeast before the incorporation of the oil has about the consistency of bran. After the oil and gum treatments the particles have a slight adherence and tend to form together in lumps which are easily crumbled with the fingers.

It will be understood that the example above given is illustrative, what I claim being as follows:

1. A vitamin food product consisting of a vitamin containing substance in massed units, the individual units being coated with a film of soluble air excluding material.

2. A vitamin food product consisting of a granular vegetable substance rich in vitamin B impregnated with an oil rich in vitamin A, the individual granules being coated with a film of edible air-excluding substance.

3. A vitamin food product consisting of granules of dried yeast, each granule being impregnated with an oil rich in vitamin A and coated with a film of edible air-excluding substance.

4. A vitamin food product consisting of granules of dried yeast, each granule being impregnated with an oil rich in vitamin A and coated with a film of Karaya gum.

5. A method of producing a protected vitamin-containing foodstuff which consists in preparing the foodstuff in granular form, treating the same with a solution of an edible gum, and drying the thus treated foodstuff.

6. A method of producing a protected vitamin-containing foodstuff which consists in preparing the foodstuff in granular form and coating the individual granules with a film of an edible air-excluding substance.

7. A method of producing a protected vitamin-containing foodstuff which consists in preparing the foodstuff in granular form and coating the individual granules with a film of Karaya gum.

8. The method of producing a vitamin-containing foodstuff which consists in mixing a granular vegetable substance rich in vitamin B with an oil rich in vitamin A until the granules absorb the oil and thereafter thoroughly stirring into the mass of oil-impregnated granules a film-forming gum until the individual granules are coated with the gum.

9. The method of producing a vitamin-containing foodstuff which consists in mixing a granular vegetable substance rich in vitamin B with an oil rich in vitamin A until the granules absorb the oil and thereafter thoroughly stirring into the mass of oil-impregnated granules a solution of film-forming gum and then drying said mass, whereby each granule is provided with an air-excluding film.

10. The method of producing a vitamin-containing foodstuff which consists in mixing a dried yeast in granular form with an oil rich in vitamin A until the granules absorb the oil and thereafter thoroughly stirring into the mass of oil-impregnated granules a solution of Karaya gum and then drying said mass, whereby each granule is provided with an air-excluding film.

11. A vitamin food product consisting of a food stuff in granular form, each granule being impregnated with an oil rich in vitamin-A and coated with a film of edible air-excluding substance.

12. The method of producing a protected vitamin-containing food stuff which consists in preparing a food stuff in granular form, impregnating the granules with an oil rich in vitamin-A and coating the individual granules with a film of an air-excluding substance.

In testimony whereof, I have signed my name to this specification.

ROBERT K. PRINCE.